ated July 29, 1969

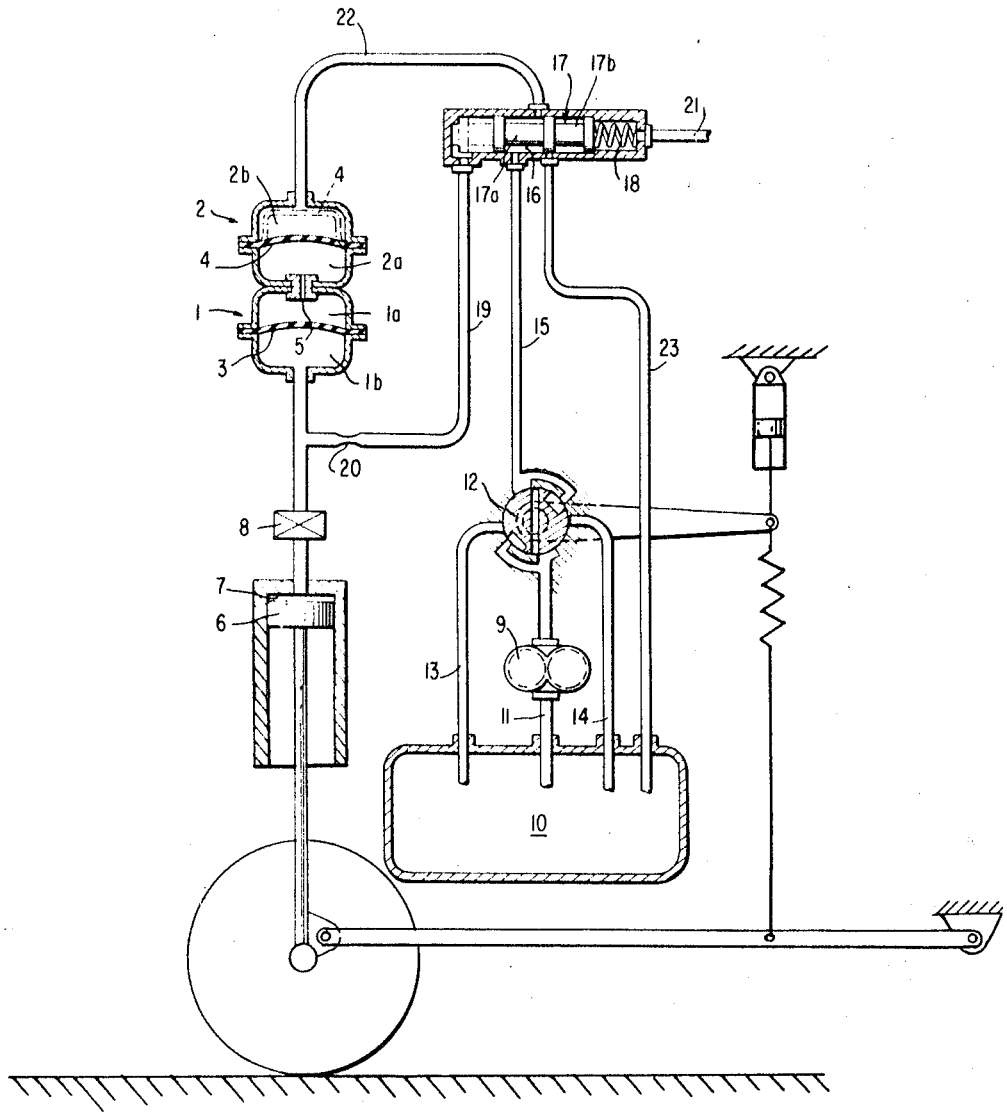

3,458,181
HYDROPNEUMATIC SPRING SYSTEM FOR
VEHICLES
Alfred H. Müller, Waiblingen, Germany, assignor to
Daimler-Benz Aktiengesellschaft, Stuttgart-Unter-
turkheim, Germany
Filed Feb. 28, 1967, Ser. No. 619,268
Claims priority, application Germany, Mar. 4, 1966,
D 49,505
Int. Cl. B60g 11/26; F16f 3/00, 5/00
U.S. Cl. 267—64                                    10 Claims

ABSTRACT OF THE DISCLOSURE

A hydropneumatic spring system for vehicles, especially commercial-type vehicles, which comprises a working pressure space subdivided by a diaphragm into a gas section and an oil section, an auxiliary pressure space, also subdivided by a diaphragm into a gas section and an oil section, with the gas sections of the working pressure space and of the auxiliary pressure space in communication with each other by way of a narrow aperture, a working cylinder containing the working piston of the spring system and operatively connected with the oil section of the working pressure space, and in which oil is selectively supplied to or removed from the oil section of the working pressure space by means of a height-adjusting valve operating in dependence on the relative distance between the axle and the vehicle body by way of a control valve which is controlled in dependence on the pressure in the oil section of the working pressure space when the vehicle in in the unloaded condition and which also selectively connects and disconnects the oil section of the auxiliary pressure space with the oil pump.

Background of the invention

The present invention relates to a hydropneumatic spring system for vehicles, and more particularly to a hydropneumatic spring system for commercial-type vehicles.

With commercial-type vehicles, large changes in the load of the springs occur in dependence on the load of the vehicle. Consequently, a hydropneumatic spring would respond with a loaded vehicle much more stiffly than with an empty vehicle.

Prerequisite for a constant natural frequency of the spring system is a constant gas spring volume. In order to achieve a constant natural frequency, it is known heretofore to provide an auxiliary pressure space in addition to the working pressure space, which auxiliary pressure space is connected with the working pressure space by way of a narrow aperture so that during higher-frequency pressure changes, no gas interchange occurs.

With changes of the load, oil is removed out of the oil section of the auxiliary pressure space or oil is supplied into the oil section of the auxiliary pressure space by means of a pump until the pre-existing height of the body is again re-established by way of a height-adjusting valve which is controlled in dependence on the distance between the axle and the body.

However, it cannot be avoided that oil losses occur at the working piston of the spring. As a result thereof, the gas spring space becomes larger and the spring correspondingly softer.

Summary of the invention

Accordingly, the present invention is concerned with the task to create a hydropneumatic spring in which the oil loss at the working piston is automatically compensated for and therewith the natural frequency of the spring system is maintained constant.

According to the present invention, this is achieved with a hydropneumatic spring having a working pressure space and an auxiliary pressure space which are each subdivided by a diaphragm into a gas and into an oil section whereby the gas sections are interconnected by way of a narrow aperture, and in which with heavier loads of the vehicle, oil is forced into the oil section of the auxiliary pressure space until the vehicle body has reached a predetermined height, in that with an unloaded vehicle a connection is established between the oil pump and the oil section of the working pressure space in dependence on the pressure in the oil section of the working pressure space, and upon reaching a predetermined height of the vehicle body, this connection is again interrupted by means of a height-adjusting valve.

Accordingly, it is an object of the present invention to provide a hydropneumatic spring system for vehicles, especially commercial-type vehicles, which is simple in construction, reliable in operation, and avoids the aforementioned shortcomings and drawbacks encountered with the prior art constructions.

It is another object of the present invention to provide a hydropneumatic spring for commercial-type vehicles in which the natural frequency of the spring system is maintained substantially constant and in which oil losses at the working piston of the spring are automatically compensated for.

These and further objects, features, and advantages of the present invention will become more obvious from the following description when taken in connection with the accompanying drawing which shows, for purposes of illustration only, one embodiment in accordance with the present invention, and wherein:

The single figure is a schematic view in cross section of one embodiment of a spring system in accordance with the present invention.

Referring now to the single figure of the drawing, the working pressure space generally designated by reference numeral 1 and the auxiliary pressure space generally designated by reference numeral 2 are each subdivided by diaphragms 3 and 4 into a gas section 1a and 2a, and into an oil section 1b and 2b, respectively. The gas sections 1a and 2a are connected with each other by way of a narrow aperture 5. The working piston 6 of the spring is arranged in a cylinder 7 which is in communication by way of a damping member 8 with the oil section 1b of the working pressure space 1. The oil necessary for the entire spring system is supplied from a pump 9 out of an oil tank 10 by way of a line 11 to a height-adjusting valve 12 of conventional construction which is constructed in the illustrated embodiment as rotary slide valve. Reference numerals 13 and 14 designate return lines from the height-adjusting valve 12 to the oil tank 10.

A pipe line 15 coming from the height-adjusting valve 12 terminates in a pressure chamber 16 in which is arranged a control slide member generally designated by reference numeral 17 which is provided with two narrow or recessed portions 17a and 17b. The control slide valve member 17 is on the one side thereof under the influence of a compression spring 18 and on the other side thereof under the influence of the pressure prevailing in the oil section 1b of the working pressure space 1 which is transmitted by way of a pipe line 19. A throttle 20 is built into the pipe line 19 which prevents the transmission of higher frequency pressure changes. Reference numeral 21 designates a venting aperture in the pressure chamber 16. Additionally, a pipe line 22 extends from the pressure chamber 16 to the oil section 2b of the auxiliary pressure space 2 and a pipe line 23 extends from the pressure chamber 16 to the oil tank 10.

Operation

The operation of the arrangement according to the present invention is as follows:

The surface or control area of the control slide member 17 which is under the influence of the load-dependent oil pressure and the characteristic of the compression spring 18 are so matched to each other that during the normal driving operation the control slide member 17 assumes the position thereof illustrated in the drawing, i.e., the pipe line 15 coming from the height-adjusting valve 12 and the pipe line 22 leading to the oil section 2b of the auxiliary pressure space 2 are connected with each other by way of the recessed portion 17a of the control slide member 17 so that the height regulation of the vehicle body can take place by way of the height adjusting valve 12. The adjustment of the height-adjusting valve thereby takes place in a conventional manner in dependence on the distance between the axle and the body.

If the pressure in the oil section 1b of the working pressure space 1 has dropped to a certain predetermined value, which lies only slightly above the value which results with an unloaded vehicle, then the control slide valve member 17 is pressed by the compression spring 18 against the decreased oil pressure from its pre-existing position into the position illustrated in dash lines whereby the pipe lines 15 and 19 are connected with each other by way of the recessed portion 17a in the control slide member 17 and the pipe lines 22 and 23 are connected with each other by way of the recessed portions 17b in the control slide member 17. The oil present in the oil section 2b of the auxiliary pressure space 2 can now flow back to the oil tank 10 by way of the pipe lines 22 and 23 so that the diaphragm 4 of the auxiliary pressure space 2 moves into the position thereof indicated in dash lines in the drawing.

Simultaneously therewith, the height-adjusting valve 12 is connected by way of the pipe lines 15 and 19 with the oil section 1b of the working pressure space 1, and with an excessively low position of the vehicle body, oil is supplied from the pump 9 into the oil section 1b for such length of time until the predetermined height of the vehicle body is reached again and the connection of the pipe lines 11 and 15 is interrupted by the height-adjusting valve 12.

With a renewed load of the vehicle, the pressure in the oil section 1b of the working pressure space 1 increases and therewith the oil pressure acting by way of the pipe line 19 on the control slide valve 17, the control slide valve 17 is pressed against the force of the compression spring 18 back into its original position shown in full line in the drawing, and the height adjustment of the vehicle body as well as the stabilization of the natural frequency take place again by way of the auxiliary pressure space 2.

The present invention thus makes it possible to maintain constant with relatively slight constructional expenditures both the height of the vehicle body as well as the natural frequency of the spring system. The replenishing of oil losses at the working piston of the spring according to the present invention exclusively with an unloaded vehicle is in practice completely sufficient because also with commercial vehicles one can count with one unloading at least once within a period of twenty-four hours.

While I have shown and described one embodiment in accordance with the present invention, it is understood that the same is not limited thereto but is susceptible of numerous changes and modifications as known to a person skilled in the art, and I therefore do not wish to be limited to the details shown and described herein, but intend to cover all such changes and modifications as are within the scope of a person normally skilled in the subject art.

I claim:

1. A hydropneumatic spring system for vehicles, especially commercial-type vehicles, comprising working pressure space means and auxiliary pressure space means, each of said space means being subdivided into a gas section and an oil section, said gas sections being operatively connected with each other by way of a narrow aperture, and means for supplying oil to the oil section of the auxiliary pressure space means during heavier loads of the vehicle until a predetermined height of the vehicle body is reached, wherein the improvement comprises control means for establishing, substantially with an unloaded vehicle and in dependence on the pressure in the oil section of the working pressure space means, a connection between the means for supplying oil and the oil section of the working pressure space means and for again interrupting said connection upon achieving a predetermined height of the vehicle body.

2. A hydropneumatic spring system according to claim 1, wherein said connection is established by said control means exclusively with a substantially unloaded vehicle.

3. A spring system according to claim 1, wherein said control means includes control valve means arranged in a pressure chamber, said control valve means being acted upon in one direction by the oil pressure prevailing in the oil section of the working pressure space means, spring means acting on said control valve means in the opposite direction, said control valve means being displaced out of its normal position with the vehicle in the unloaded condition in case of an excessively low position of the vehicle body and establishing said connection between a first line connecting said supply means with said pressure chamber and a second line leading from said pressure chamber to the oil section of the working space means so that oil is supplied to the oil section of the working space means for such length of time until upon reaching a predetermined height of the vehicle body said first line is again interrupted.

4. A spring system according to claim 3, wherein the characteristic of the spring means and the area of the control valve means which is under the influence of oil pressure prevailing in the oil section of the working pressure space means are so matched to each other that upon reloading of the vehicle, the control valve means is pressed back into its normal position against the force of the spring means in which position a connection of a third line leading to the oil section of the auxiliary pressure space means is established with the first line.

5. A spring system according to claim 3, in which a connection of the third line with a discharge line leading to an oil tank is established with an unloaded vehicle by the control valve means.

6. A hydropneumatic spring system for vehicles, especially commercial-type vehicles, comprising working pressure space means and auxiliary pressure space means, each of said space means being subdivided into a gas section and an oil section, said gas sections being operatively connected with each other by way of a narrow aperture, and means including height-adjusting valve means for supplying oil to the oil section of the auxiliary pressure space means during heavier loads of the vehicle until a predetermined height of the vehicle body is reached, wherein the improvement comprises control means for establishing substantially with an unloaded vehicle and in dependence on the pressure in the oil section of the working pressure space means, a connection between the means for supplying oil and the oil section of the working pressure space means and for again interrupting said connection upon achieving a predetermined height of the vehicle body by said height-adjusting valve means.

7. A spring system according to claim 6, wherein said control means includes control valve means arranged in a pressure chamber, said control valve means being acted upon in one direction by the oil pressure prevailing in the oil section of the working pressure space means, spring means acting on said control valve means in the opposite direction, said control valve means being dsiplaced out of its normal position with the vehicle in the unloaded condition in case of an excessively low position of the vehicle body and establishing said connection between a first line connecting said height-adjusting valve means with said pressure chamber and a second line leading from said pressure chamber to the oil section of the working space means so that oil is supplied to the oil section of the working space means for such length of time until upon reaching a predetermined height of the vehicle body said first line is again interrupted by the height-adjusting valve means.

8. A spring system according to claim 7, wherein the characteristic of the spring means and the area of the control valve means which is under the influence of oil pressure prevailing in the oil section of the working pressure space means are so matched to each other that upon reloading of the vehicle, the control valve means is pressed back into its normal position against the force of the spring means in which position a connection of a third line leading to the oil section of the auxiliary pressure space means is established with the first line.

9. A spring system according to claim 8, in which a connection of the third line with a discharge line leading to an oil tank is established with an unloaded vehicle by the control valve means.

10. A hydropneumatic spring system according to claim 9, wherein said connection is established by said control means exclusively with a substantially unloaded vehicle.

References Cited

UNITED STATES PATENTS 2,620,182   12/1952   Marston et al. _____ 267—64
3,323,810   6/1967   Klein _____ 267—64 X ARTHUR L. LA POINT, Primary Examiner U.S. Cl. X.R.

280—6